United States Patent

Grabl

[15] 3,705,337
[45] Dec. 5, 1972

[54] MOTOR CONTROL SYSTEM WITH BRIDGE SENSING EMF

[72] Inventor: Sebastian E. Grabl, Thousand Oaks, Calif.

[73] Assignee: Burroughs Corporation, Detroit, Mich.

[22] Filed: Oct. 12, 1970

[21] Appl. No.: 80,082

[52] U.S. Cl. .................................318/331, 318/345
[51] Int. Cl. .............................................H02p 5/16
[58] Field of Search......318/331, 334, 339, 345, 473; 321/75; 317/13 A

[56] References Cited

UNITED STATES PATENTS

| | | | |
|---|---|---|---|
| 1,903,491 | 4/1933 | Wilms | 317/13 A |
| 3,560,828 | 2/1971 | Kobayashi et al. | 318/332 X |
| 3,447,055 | 5/1969 | Mason | 318/345 X |
| 3,457,460 | 7/1969 | Buiting et al. | 318/473 X |
| 3,475,672 | 10/1969 | Oltendorf | 318/349 X |

Primary Examiner—J. D. Miller
Assistant Examiner—Robert J. Hickey
Attorney—Christie, Parker & Hale

[57] ABSTRACT

The rotational speed of a motor armature is controlled by sensing the counter EMF of the motor. The motor is excited responsive to the difference between a motor command signal and a feedback signal representative of the motor counter EMF. A temperature sensor changes the feedback signal responsive to changes in the armature temperature. A stream of fluid is directed from the armature to the temperature sensor so as to couple thermally the armature thereof. The feedback signal is generated across the output terminals of a bridge network to the input terminals of which the motor excitation signal is applied. The motor armature comprises one arm of the bridge and the other arms of the bridge are resistive elements of predetermined value. The change in the feedback signal responsive to temperature is effected by a thermistor that has a negative temperature coefficient substantially larger than that of the armature resistance. The thermistor forms part of one of the resistive elements of the bridge. The thermistor is also employed to sense overheating of the motor and discontinuance of the fluid stream. A low-pass filter connected across one output terminal of the bridge compensates for the inductance of the motor.

17 Claims, 4 Drawing Figures

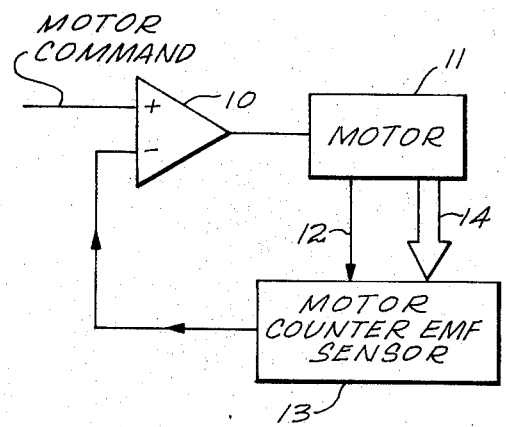
FIG_1
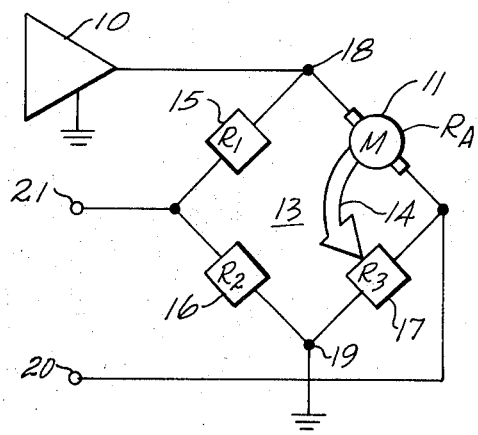
FIG_2
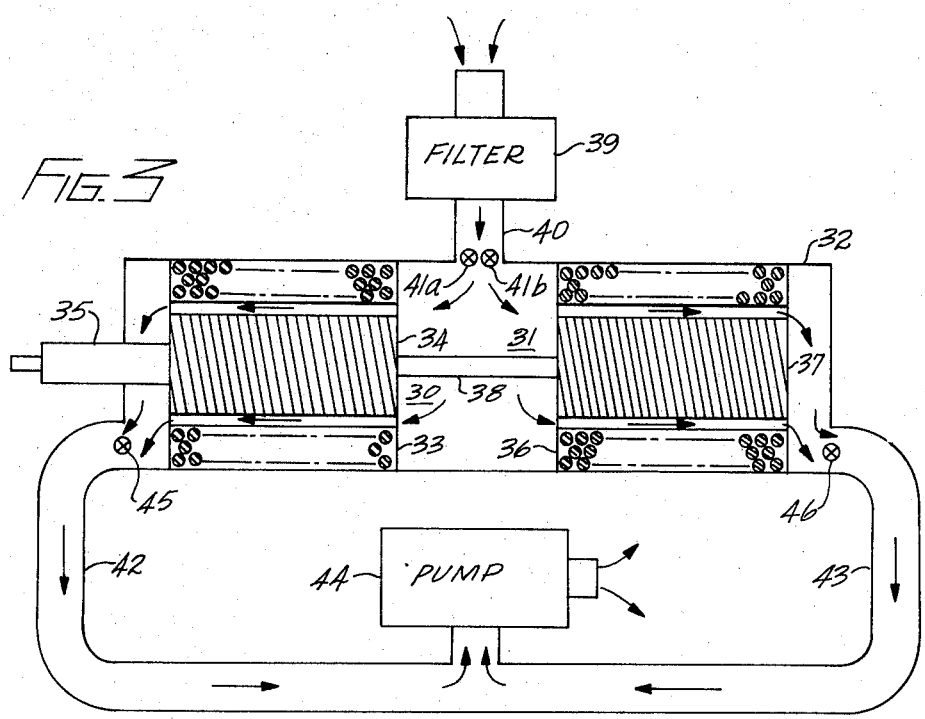
FIG_3
INVENTOR.
SEBASTIAN E. GRABL
BY
Christie, Parker, & Hale
ATTORNEYS

MOTOR CONTROL SYSTEM WITH BRIDGE SENSING EMF

BACKGROUND OF THE INVENTION

This invention relates to motor speed control and, more particularly, to improved apparatus for sensing the counter EMF of a motor in order to generate a feedback signal that is proportional to the rotational speed of the motor.

Conventionally, a speed control system comprises a motor, a tachometer mechanically coupled to the armature of the motor to sense its actual speed, and a power amplifier for exciting the motor. A speed command signal and the output of the tachometer are differentially applied to the amplifier, thereby controlling the actual speed of the motor to correspond to the speed represented by the command signal. There are a number of disadvantages to the use of a tachometer to rotational speed. First, it is sometimes difficult and costly to establish a satisfactory mechanical coupling between the tachometer and the motor armature. A stiff coupling requires precise alignment, while a flexible coupling introduces additional transients and is costly. Further, mechanical coupling of the tachometer to the motor, loads the motor and accordingly reduces the power available for performing the assigned task. An electrical problem is the ripple found on the output signal generated by all but the most expensive tachometers. In order to suppress this ripple, the output signal must be filtered, which slows the response of the control system.

In a number of types of motors, notably direct current motors with a constant field, the counter-electromotive force (hereafter called EMF) generated is proportional to the actual rotational speed of the motor armature. Further, the counter EMF equals the armature terminal voltage minus the product of the armature current and the armature resistance. A technique described in the article entitled "A Simple Resistor Network Eliminates DC Tachometer" by Martin Kanner in *Electronic Design* 26, Dec. 19, 1968 at page 100, utilizes these characteristics to generate a signal that is proportional to the counter EMF of a motor. Specifically, the armature of the motor forms one arm of a bridge network and the ratios of adjacent arms are set equal to balance the bridge. The motor excitation signal is applied to the input of the bridge and the signal representative of the counter EMF of the motor appears at the output of the bridge. The temperature of the motor can vary over a considerable range if the activity of the motor is not regular. In such case, the resistance of the armature changes and the bridge network becomes unbalanced. As a result, the signal generated at the output of the bridge network is not truly representative of the armature speed.

SUMMARY OF THE INVENTION

According to the invention, the amplitude of a signal representative of motor counter armature. A temperature sensor is placed in close proximity to the armature and a stream of fluid at a lower temperature than the armature is directed from the armature to the temperature sensor to couple thermally the armature to the temperature sensor. As the temperature of the armature changes, the temperature sensor compensates for changes in the armature resistance, thereby maintaining constant the signal representative of the counter EMF.

Most advantageously, the temperature sensor is a thermistor that has a negative, substantially larger temperature coefficient than the armature resistance. The thermistor forms part of one of the arms of a bridge network that generates a signal proportional to the motor counter EMF. Accordingly, when the armature resistance changes due to temperature, the resistance of one of the other arms of the bridge also changes so as to maintain the bridge in balance.

A feature of the invention is the use of a second temperature sensor to compensate for changes in the temperature of the fluid source from which the stream emanates. This temperature sensor is located in the fluid path upstream of the motor armature and is so connected into the bridge network that no change in its output signal occurs when the temperature of the fluid source rises while the temperature of the motor armature remains constant.

Another feature of the invention is the provision of a low-pass filter to compensate for the inductance of the motor armature. The low-pass filter delays the signal in one half of the bridge by bringing it into phase with the signal in the other half of the bridge. As a result, transients are suppressed at the output of the bridge.

Still another feature of the invention is the use of the thermistor to sense malfunctions, namely motor overheating and discontinuance of the fluid stream.

DESCRIPTION OF THE DRAWINGS

The features of a specific embodiment of the best mode contemplated of carrying out the invention are illustrated in varying detail in the drawings, in which:

FIG. 1 is a block schematic diagram of a speed control system;

FIG. 2 is a block schematic diagram of the motor counter EMF sensor depicted in FIG. 1;

FIG. 3 is a schematic diagram of the thermal coupling between the motor of FIG. 1 and the motor counter EMF sensor of FIG. 1.

DETAILED DESCRIPTION OF THE DRAWINGS

Figure 4:
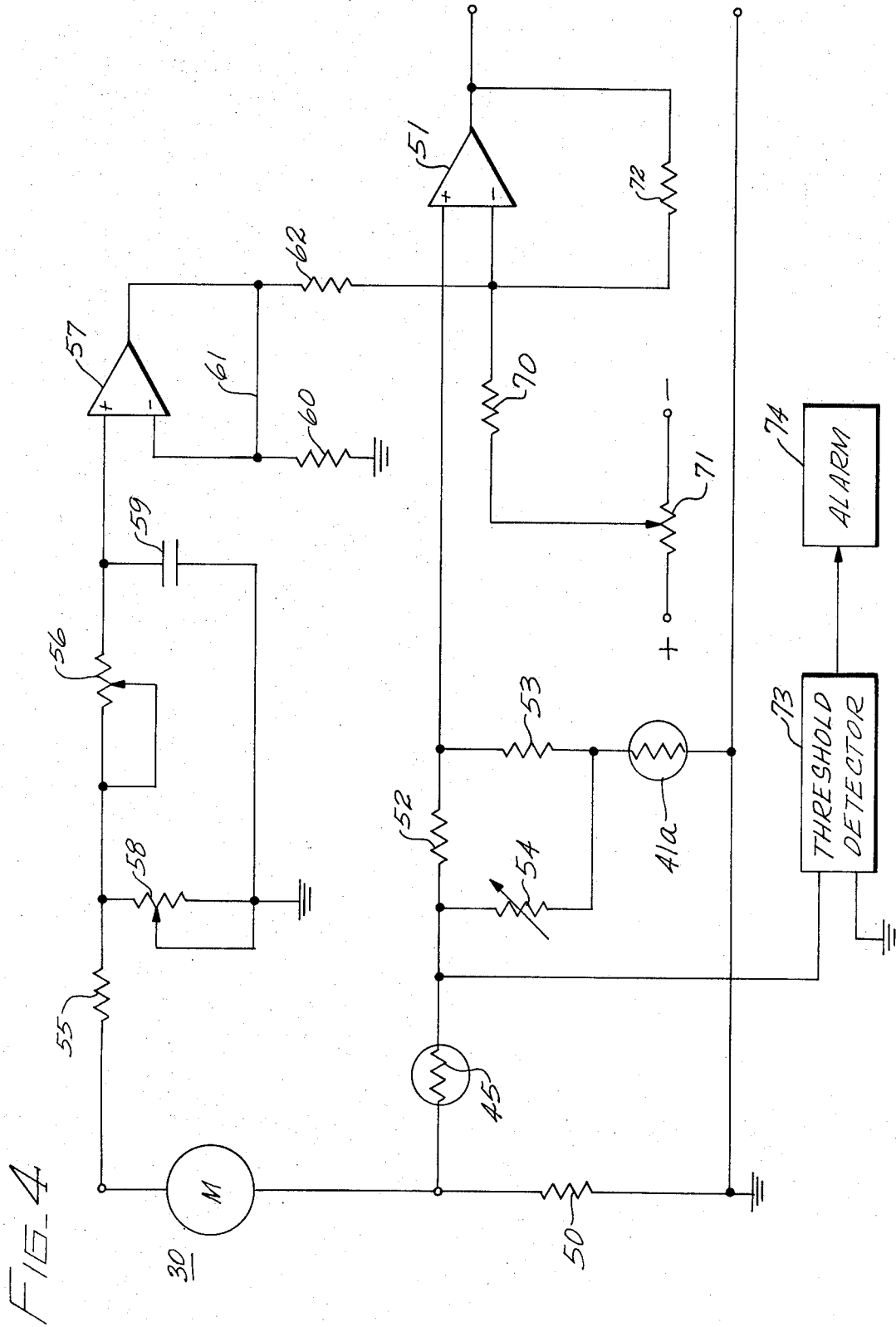
FIG. 4 is a detailed schematic circuit diagram of the motor counter EMF sensor depicted in block form in FIG. 2.

In FIG. 1, a differential motor drive amplifier 10 excites a motor 11. As represented by a single lined arrow 12, motor 11 is electrically coupled to a motor counter EMF sensor 13, which produces a feedback signal representative of the counter EMF generated by motor 11. Motor 11 is a type of motor that generates a counter EMF proportional to the rotational speed of its armature. Generally, this is a motor having a constant field, such as a direct current motor with a permanent magnetic field. A motor command signal is coupled to the non-inverting input of amplifier 10, which is designated by a plus sign, and the feedback signal produced by sensor 13 is coupled to the inverting input of amplifier 10, which is designated by a minus sign. Thus, there is formed a closed loop speed control system in which the actual rotational speed of motor 11 is maintained at the speed represented by the motor command signal. To the extent described to this point of the detailed description, the control system of FIG. 1 is conventional. However, the present invention calls for a thermal coupling from motor 11 to sensor 13, as represented by a double lined arrow 14. Thus, as the temperature of the armature of motor 11 changes due to the irregularity of its activity, this change is communicated to sensor 13 to permit compensation for the resulting changes in resulting armature resistance.

In FIG. 2, sensor 13 is depicted as a bridge network. One arm of the bridge network is the armature of motor 11, which has a resistance $R_A$. The remainder of the bridge network is formed by arms 15, 16, and 17, which have resistances $R_1$, $R_2$, and $R_3$, respectively. Input terminals 18 and 19 of the bridge network are formed respectively at the junction of motor 11 and arm 15 and at the junction of arms 16 and 17. Output terminals 20 and 21 of the bridge network are formed respectively at the junction of motor 11 and arm 17 and at the junction of arms 15 and 16. Arm 17 serves to sense the armature current of motor 11 because it is connected in series therewith. Accordingly, the potential between terminal 20 and ground is proportional to the armature current of motor 11. Arm 16 serves to sense the armature terminal voltage of motor 11 because it and arm 15 are a voltage divider connected in parallel with motor 11. Thus, the voltage between terminal 21 and ground is proportional to the armature terminal voltage of motor 11. As explained in the above-identified article in Electronic Design, the signal across output terminals 20 and 21 is proportional to the counter EMF generated by motor 11, if the bridge network is balanced, i.e., if the ratio $R_A/R_3$ equals the ratio $R_1/R_2$. According to the present invention, the effective value of the resistance of arm 15, 16, or 17 is changed responsive to changes in the temperature of the armature of motor 11 so as to maintain the bridge network in balance, i.e., to maintain equality between these ratios as the armature resistance $R_A$ changes responsive to the changes in the armature temperature. Thus, changes in the resistance of the motor armature due to temperature changes are compensated for by a change in the effective resistance of another arm of the bridge. In FIG. 2, as represented by arrow 14, the resistance $R_3$ of arm 17 changes responsive to the temperature of the armature of motor 11. Specifically, part of arm 17 comprises a thermistor that has a temperature coefficient substantially larger than that of armature resistance $R_A$. Whether the temperature coefficient is positive or negative depends upon how the thermistor is connected to the other resistive elements of that arm.

The temperature compensation can also be explained in the following terms: The voltage across arm 16 provides negative feedback control over the speed of motor 11 and the voltage across arm 17 provides a lesser positive feedback control thereover for the purpose of cancelling the effect of the armature IR drop. As the armature IR drop changes with armature temperature, the positive feedback control tends to change. To defeat this tendency, one of the feedback controls is changed responsive to the temperature of the armature, so the sum of the positive and negative feedback control remains constant as the armature temperature changes.

FIG. 3 depicts schematically the thermal coupling between the motor armature and the thermistors in one of the arms of the bridge network. Coaxial motors 30 and 31 which could drive a pair of coaxial tape storage reels, as shown in U.S. Pat. No. 3,345,007, which issued Oct. 3, 1967 in the name of Harry F. Rayfield, are enclosed in a cylindrical casing 32. Motor 30 has an annular field winding 33 fixed to casing 32 and a rotatable armature winding 34 mounted on a hollow shaft 35. Motor 31 has annular field winding 36 fixed to casing 32 and a rotatable armature winding 37 mounted on a shaft 38. Shaft 38 extends through shaft 35 to one end of casing 32 where shafts 35 and 38 exit from casing 32. Shafts 35 and 38 are supported by means not shown so they are rotatable relative to each other and relative to casing 32. The input of an air filter 39 is open to the atmosphere. The output of filter 39 is connected by an entrance conduit 40 to the center of casing 32. Thermistors 41a and 41b or other resistive devices having a high temperature coefficient are mounted in conduit 40 so they are exposed to the air traveling therethrough. Exit conduits 42 and 43 connect the input of a pump 44 to the ends of casing 32. The output of pump 44 empties into the atmosphere. Thermistors 45 and 46 are mounted at the ends of casing 32 near conduits 42 and 43, respectively. Pump 44 draws air from the atmosphere through filter 39 into casing 32. The air is directed through the space between field winding 33 and armature 34 and through the space between field winding 36 and armature 37 and is delivered to pump 44 by conduits 42 and 43. Thermistors 41a and 41b sense the temperature of the air prior to passage by armatures 34 and 37. Thermistors 45 and 46 sense the temperature of the air immediately after passage by armatures 34 and 37. Thermistors 41a and 45 are electrically part of circuitry for sensing the counter EMF of motor 30 and function to compensate for changes in the temperature of armature 34 and the atmosphere. Similarly, thermistors 41b and 46 are electrically part of circuitry for sensing the counter EMF of motor 31 and function to compensate for changes in the temperature of armature 37 and the atmosphere. The invention is particularly valuable in connection with a reel drive motor for a tape handling unit that serves as peripheral equipment for a digital computer because of the irregular activity of such a motor.

FIG. 4 illustrates in detail the circuitry for sensing the counter EMF of motor 30. The circuitry for sensing the counter EMF of motor 31 could be the duplicate of the disclosed circuitry. The armature of motor 30 and a resistor 50 are connected in series across the output of the motor drive amplifier. The junction of motor 30 and resistor 50 is connected to the non-inverting input of a differential amplifier 51 by the series combination of thermistor 45 and a resistor 52. The non-inverting input of amplifier 51 is connected to ground by the series combination of a resistor 53 and thermistor 41a. A potentiometer 54, which serves to adjust the thermal compensation introduced by thermistors 41a and 45 to the change in armature resistance of motor 30 due to temperature, is connected between the junction of thermistor 45 and resistor 52 and the junction of thermistor 41a and resistor 53. Resistor 50 functions as arm 17 of the bridge network of FIG. 2. Thermistors 41a and 45, resistors 52 and 53, and potentiometer 54 serve as an armature temperature compensating network to couple the voltage across resistor 50, which is proportional to the armature current of motor 30, to amplifier 51.

A resistor 55 and a potentiometer 56 are connected in series between the terminal of motor 30 opposite resistor 50 and the non-inverting input of a differential amplifier 57. A potentiometer 58 connects the junction of resistor 55 and potentiometer 56 to ground. As explained in more detail below, the setting of potentiometer 58 provides an adjustment for the armature resistance of motor 30, which may vary substantially from motor to motor. A capacitor 59 is connected between the non-inverting input of amplifier 57 and ground. As explained in more detail below, potentiometer 56 and capacitor 59 form a low-pass filter that compensates for the armature inductance of motor 30. A resistor 60 couples the inverting input of amplifier 57 to ground. A direct feedback connection 61, which couples the output of amplifier 57 to its inverting input, causes amplifier 57 to function as an operational amplifier. The output of amplifier 57 is coupled by a resistor 62 to the inverting input of amplifier 51. Resistor 55 and potentiometer 58 function as arms 15 and 16, respectively, of the bridge network of FIG. 2. The voltage appearing across potentiometer 58 is proportional to the armature terminal voltage of motor 30.

The inverting input of amplifier 51 is also connected by a resistor 70 to the slider arm of a potentiometer 71, which is connected between the positive and negative terminals of a battery (not shown). Potentiometer 71 permits correction for the drift of amplifiers 51 and 57. A resistor 72 connects the output of amplifier 51 to the inverting input thereof so amplifier 51 functions as an operational amplifier. Amplifier 51 references to ground at its output the voltage difference appearing at its inputs, which is essentially the bridge network output voltage appearing across terminals 20 and 21 of FIG. 2.

Thermistors 41a and 45 have high identical negative temperature coefficients that are larger than the temperature coefficient of the armature resistance of motor 30. Thermistor 45 and resistor 52, resistor 53 and thermistor 41a form a voltage divider across resistor 50. Assuming that motor 30 is driven by a constant current source, its terminal voltage increases as the armature resistance increases due to a rise in the armature temperature. This causes an increase in the potential at the inverting input of amplifier 51. The rise in the armature temperature of motor 30 reduces the resistance of thermistor 45 and thereby increases the potential at the non-inverting input of amplifier 51, to compensate for the increase at the inverting input thereof. The heat transfer from the armature of motor 30 to thermistor 45 is inherently accompanied by a temperature drop. The overall temperature coefficient of the voltage divider is adjusted by potentiometer 54 so the changes in potential at the non-inverting input of amplifier 51 match the changes in potential at its inverting input for the particular temperature drop from armature 30 to thermistor 45 in each case.

Assuming that the air in the atmosphere is at a substantially lower temperature than the armature of motor 30 and the atmospheric air temperature changes, the temperature of thermistor 45 changes accordingly even if the temperature of the armature remains constant. Thermistor 41a offsets the effect of changes in the atmospheric air temperature on the resistance of thermistor 45. When the atmosphere air temperature rises, the resistance of thermistors 41a and 45 are reduced by the same amount so the potential at the non-inverting input of amplifier 51 is unaffected.

Due to the inductance of the armature winding of motor 30, the armature terminal voltage leads the voltage across resistor 50 in phase. Consequently, changes in the armature terminal voltage of motor 30 cause transients to appear at the output of amplifier 51. These transients are suppressed by the low-pass filter comprising capacitor 59 and potentiometer 56, which in effect delays the transmission of the terminal voltage of motor 30 so that it arrives at the input of amplifier 51 in phase with the voltage across resistor 50. Potentiometer 56 permits the delay to be varied, depending upon the inductance of the particular motor being used.

The resistance of potentiometer 58 determines the resistance of arm 15 of the bridge network (FIG. 2). Depending upon the armature resistance of the particular motor being used, potentiometer 58 is set so $R_1/R_2$ equals $R_A/R_3$. In other words, potentiometer 58 adjusts the balance of the bridge network to the armature resistance of the motor.

Thermistor 45 is also used to detect malfunctions of the described system. When the casing of motor 30 becomes overheated, the resistance of thermistor 45 drops sharply. A threshold detector 73 is connected in series with thermistor 45 across resistor 50. When the resistance of thermistor 45 drops, the voltage across threshold detector 73 rises and an alarm 74 is actuated. By proper component selection, thermistor 45 can also be used to sense a disruption in the thermal coupling from motor 30. Specifically, the circuitry is designed such that thermistor 45 is substantially heated in normal operation, the air flow from the armature of motor 30 cooling thermistor 45. When the air flow is interrupted, the temperature of thermistor 45 rises sharply, thereby actuating alarm 74.

It is assumed that the resistances of all the components in FIG. 4 except motor 30 and thermistors 41a and 45 remain constant because of their low temperature coefficients and their physical separation from the heat of motor 30.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention.

What is claimed is:

1. Apparatus for sensing the counter EMF of a motor having an armature that rotates responsive to an excitation signal, the speed of rotation of the armature being proportional to the counter EMF of the motor and the counter EMF of the motor being equal to the armature terminal voltage minus the armature current times the armature resistance, the apparatus comprising:

first means for sensing the armature current, the first sensing means comprising a first resistor connected in series with the armature of the motor and means for sensing the voltage across the first resistor;

second means for sensing the armature terminal voltage, the second sensing means comprising a voltage divider having second and third resistors in series, the second resistor being connected to the armature and the third resistor being connected to the first resistor, and means for sensing the voltage across the third resistor;

third means for sensing the armature temperature, the third sensing means comprising a first resistive element located in close proximity to the armature of the motor, the first resistive element having a larger temperature coefficient than the resistance of the armature and connected in circuit with one of the resistors so as to compensate for changes in resistance of the armature;

a source of fluid;

means for directing the fluid in a stream from the armature to the third means to couple the armature thermally to the third means;

means responsive to the first, second, and third means for generating a signal representative of the counter EMF of the motor, the generating means comprising means for subtracting the voltage across the third resistor from the voltage across the first resistor; and a second resistive element having a termperature coefficient identical to the first resistive element, the second resistive element being disposed in the fluid stream between the source and the armature and being connected in circuit with one of the resistors to offset changes in the resistance of the first resistive element due to changes in temperature of the source of fluid.

2. The apparatus of claim 1, in which the first and second resistive elements are connected in series across the first resistor to form a voltage divider and the generating means is responsive to the voltage across the first resistive element.

3. The apparatus of claim 1, in which a fourth resistor, a fifth resistor, and a potentiometer are provided, the first resistor element, the fourth resistor, the fifth resistor and the second resistive element are connected in series across one of the resistors recited in claim 1 to form a voltage divider, the first resistive element and the fourth resistor lie on one side of a common node, the fifth resistor and the second resistive element lie on the other side of the common node, the fourth and fifth resistors are connected to the node, the potentiometer is connected in parallel with the fourth and fifth resistors, and the generating means is responsive to the voltage across the fifth resistor and the second resistive element.

4. The apparatus of claim 6, in which means are provided for delaying the voltage appearing across the third resistor to compensate for the inductance of the armature of the motor.

5. The apparatus of claim 7, additionally comprising a threshold detector coupled to the first resistive element to sense a sharp change in its resistance and an alarm actuated responsive to the threshold detector when a sharp change takes place in the resistance of the first resistive element.

6. The apparatus of claim 1, in which the first sensing means generates an electrical signal representative of the armature current, the second sensing means generates an electrical signal representative of the armature terminal voltage, the apparatus additionally comprising means for delaying the electrical signal generated by the second sensing means to compensate for the inductance of the armature, the means for generating a signal representative of the counter EMF of the motor being responsive to the signal generated by the first means and the delayed signal generated by the second means.

7. Apparatus for sensing the counter EMF of a motor, the apparatus comprising:

first and second input nodes;

first and second output nodes;

a motor connected between the first input node and the first output node, the motor having a rotating armature, the counter EMF generated by the motor being proportional to the speed of rotation of the armature;

a first impedance connected between the second input node and the first output node in series with the armature of the motor;

a second impedance and a third impedance connected in series respectively between the first input node and the second output node and between the second output node and the second input node to form a bridge network; and a fourth impedance and a fifth impedance connected in series between one of the output nodes and the second input node, the value of the fourth impedance changing in response to temperature changes of the armature to compensate for such armature temperature changes, the temperature coefficient of the fourth impedance being larger than the temperature coefficient of the resistance of the armature, the value of the remaining impedances including the fifth impedance connected between the one output node and the second input node being unaffected by armature temperature changes.

8. The apparatus of claim 7, additionally comprising means for directing a stream of air from the armature to the fourth impedance so as to couple thermally the armature to the fourth impedance so its value responds to armature temperature changes.

9. The apparatus of claim 7, in which one end of the fourth impedance is connected to the first output node, one end of the fifth impedance is connected to the second input node, the fourth impedance has a negative temperature coefficient, and the voltage across the fifth impedance is utilized to indicate the counter EMF.

10. The apparatus of claim 8, in which the fifth impedance has a temperature coefficient identical to that of the fourth impedance and is disposed in the stream of air upstream of the armature to compensate for the effect of changes in temperature of the stream of air on the fourth impedance.

11. A motor control system comprising:

a motor having an armature that rotates response to an excitation signal, the motor generating a counter EMF proportional to the rotational speed of its armature, the counter EMF of the motor being equal to the armature terminal voltage minus the product of the armature current and the armature resistance;

means for producing an electrical feedback signal representative of the counter EMF of the motor;

first means in proximity to one side of the armature responsive to temperature changes for changing the feedback signal;

second means in proximity to the other side of the armature responsive to temperature changes for changing the feedback signal;

a source of fluid directed in a fluid stream that passes the first feedback signal changing means, the armature, and the second feedback signal changing means such that the first feedback signal changing means lies between the source and the armature and the armature lies between the first and second feedback signal changing means in the path of the fluid stream; and means responsive to the difference between a motor command signal and the feedback signal for applying an excitation signal to the motor armature.

12. The control system of claim 11, in which the means for producing the feedback signal comprises:

a first resistor connected in series with the armature;

second and third resistors connected in series;

means for connecting the second and third resistors in parallel with the armature and the first resistor to form a bridge network, the resistance ratio of the armature divided by the first impedance substantially equalling resistance ratio of the second impedance divided by the third impedance; and means for subtracting the voltage across the first impedance from the voltage across the third impedance to form the feedback signal.

13. The control system of claim 12, in which the second means for changing the feedback signal comprises a thermistor connected in circuit with one of the resistors, the armature being disposed in the path of the fluid stream between the source and the thermistor.

14. The control system of claim 13, in which the first means for changing the feedback signal additionally comprises a second thermistor connected in circuit with the first thermistor and the one resistor, the second thermistor being disposed in the path of the fluid stream between the source and the armature to offset the effect of changes in the fluid temperature prior to the armature on the resistance of the first thermistor.

15. Apparatus for sensing the counter EMF of a motor having an armature that rotates responsive to an excitation signal, the speed of rotation of the armature being proportional to the counter EMF of the motor, and the counter EMF of the motor being equal to the armature terminal voltage minus the armature current times the armature resistance, the apparatus comprising:

a first impedance connected in series with the armature of the motor;

a second impedance and a third impedance connected in series;

means for connecting the motor armature and the first impedance in parallel with the second and third impedances to form a bridge network;

first and second output terminals; means for means one of the junctions to the first output terminal; and a phase shifting network connecting the other junction to the second output terminal, the phase shifting network introducing a phase shift that brings the signal at the second output terminal into phase with the signal at the first output terminal.

16. The apparatus of claim 15, in which the phase shifting network is a low pass filter connecting the junction of the second and third impedances to the second output terminal.

17. Apparatus for sensing the counter EMF of a motor, the apparatus comprising:

a motor having a rotating armature, the counter EMF generated by the motor being proportional to the speed of rotation of the armature;

a first impedance connected in series with the armature of the motor;

a second impedance and a third impedance connected in series;

means for connecting the motor armature and the first impedance in parallel with the second and third impedances to form a bridge network;

first and second output terminals connected respectively to the junction of the armature and the first impedance and the junction of the second and third impedances, the voltage at the second output terminal leading the voltage at the first output terminal due to the inductance of the motor;

means responsive to temperature changes of the armature for changing the effective value of one of the impedances to maintain the ratio of the value of the impedance of the armature divided by the value of the first impedance substantially equal to the ratio of the value of the second impedance divided by the value of the third impedance;

a voltage combining circuit having first and second inputs;

means for coupling the first output terminal of the bridge network to the first input of the combining circuit; and means for coupling the second output terminal of the bridge network to the second input of the combining circuit, one of the coupling means introducing a phase shift that brings the voltages at the first and second inputs into phase so as to compensate for the inductance of the motor.

* * * * *

PO-1050
(5/69)
6921

UNITED STATES PATENT OFFICE
CERTIFICATE OF CORRECTION

Patent No. 3,705,337  Dated December 5, 1972

Inventor(s) Sebastian E. Grabl

It is certified that error appears in the above-identified patent and that said Letters Patent are hereby corrected as shown below:

In the Abstract, line 9, change "thereof" to --thereto--.

Patent column 1, line 16, insert --signal-- between "output" and "of";
line 21, before "rotational" insert --sense--;
line 62, between "counter" and "armature" insert --EMF is changed responsive to changes in the temperature of the motor--.

Patent column 7, line 42, change "the first resistor element" to --the first resistive element--;
line 54, change "6" to --3--;
line 59, change "7" to --4--.

Patent column 8, line 60, change "response" to --responsive--.

Patent column 10, line 6, start a new paragraph with "means"; line 6, cancel "means for" line 7, after "means" insert --for coupling --; line 24, between "motor" and the semicolon insert --to form therebetween a first junction--;
line 26, between "series" and the semicolon insert --to form therebetween a second junction--;
line 31, between "the" and "junction" insert --first--, delete "of the armature and the first";
line 32, delete "impedance", between "the" and "junction" insert --second--, delete "of the second and";
line 33, delete "third impedances".

Signed and sealed this 29th day of January 1974.

(SEAL)
Attest:

EDWARD M. FLETCHER, JR.  RENE D. TEGTMEYER
Attesting Officer  Acting Commissioner of Patents